Figure 1:
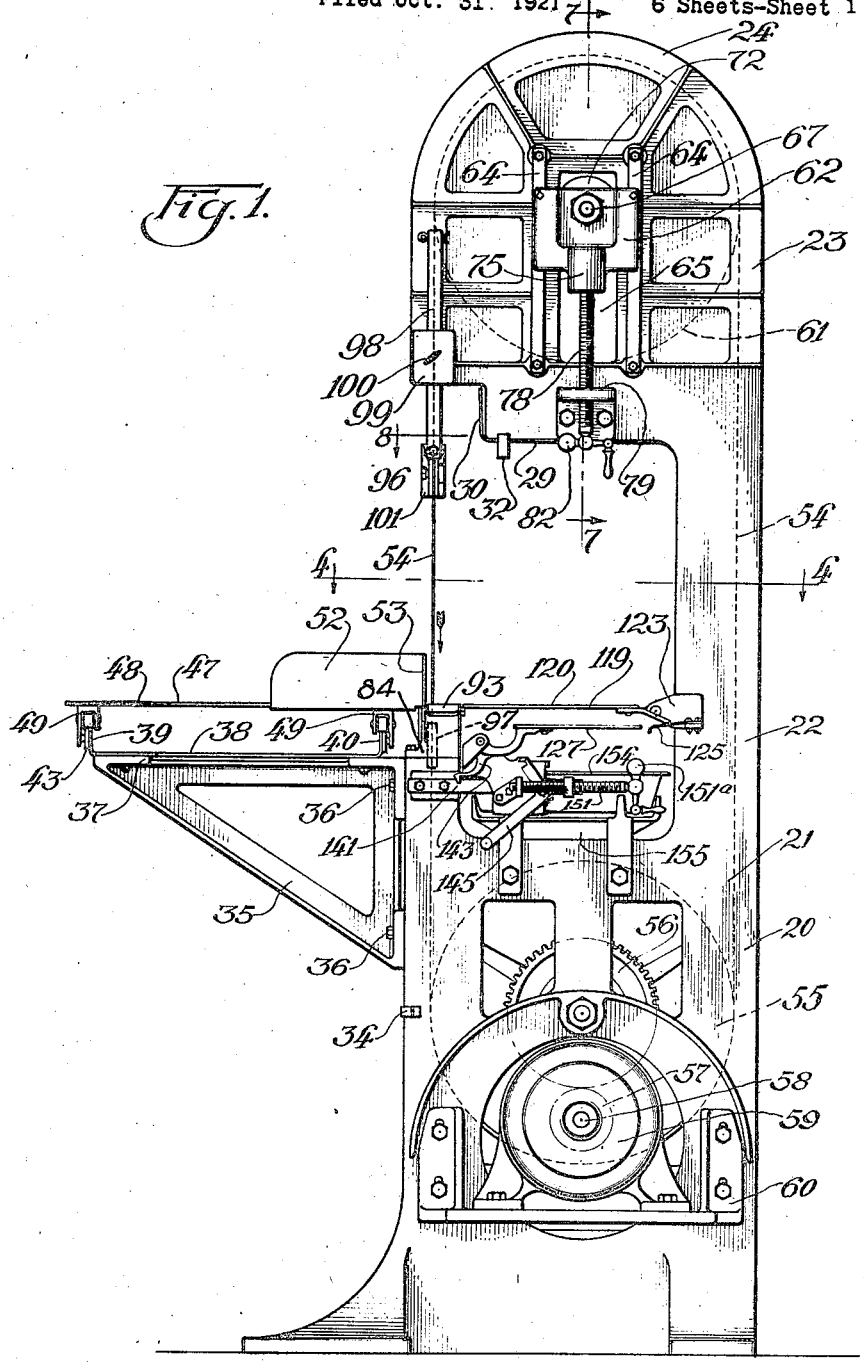

June 24, 1924.

F. J. REICHMANN

CUTTING MACHINE

Filed Oct. 31, 1921

1,499,124

6 Sheets-Sheet 1

Inventor:
Frank J. Reichmann.
By Dyrenforth, Lee, Chritton & Wiles.
Attys.

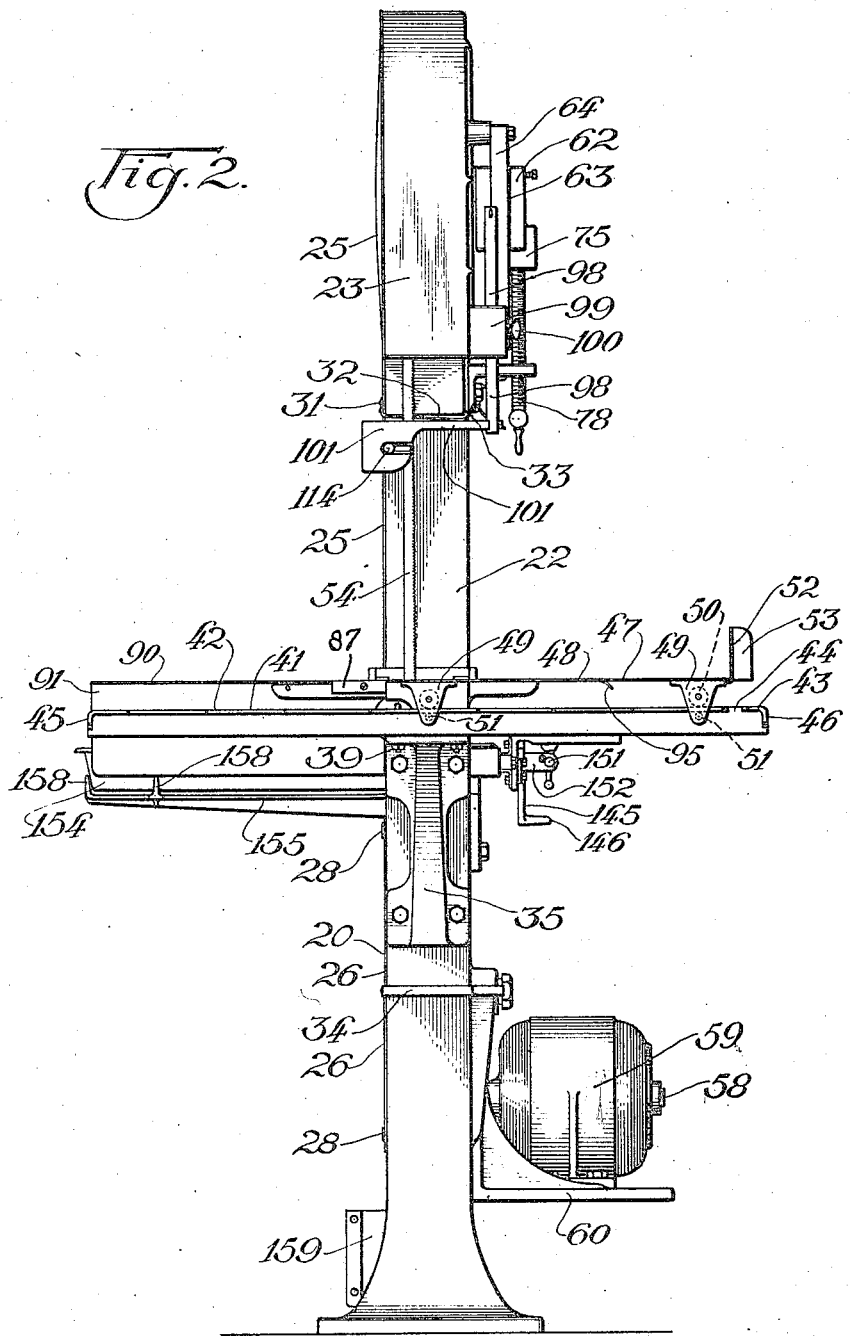

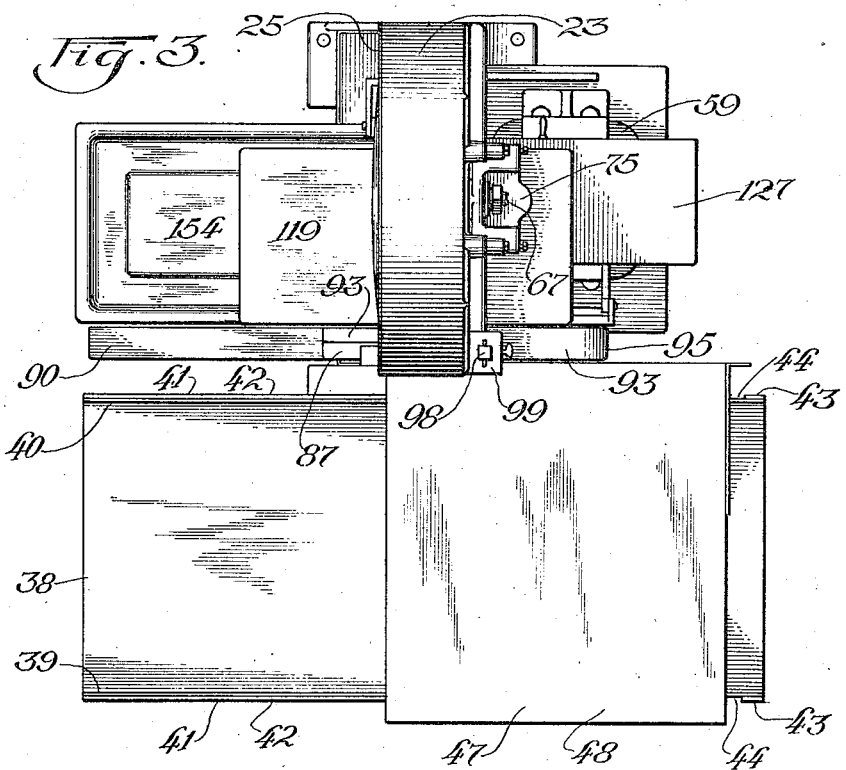

June 24, 1924.
F. J. REICHMANN
CUTTING MACHINE
Filed Oct. 31, 1921
1,499,124
6 Sheets-Sheet 4
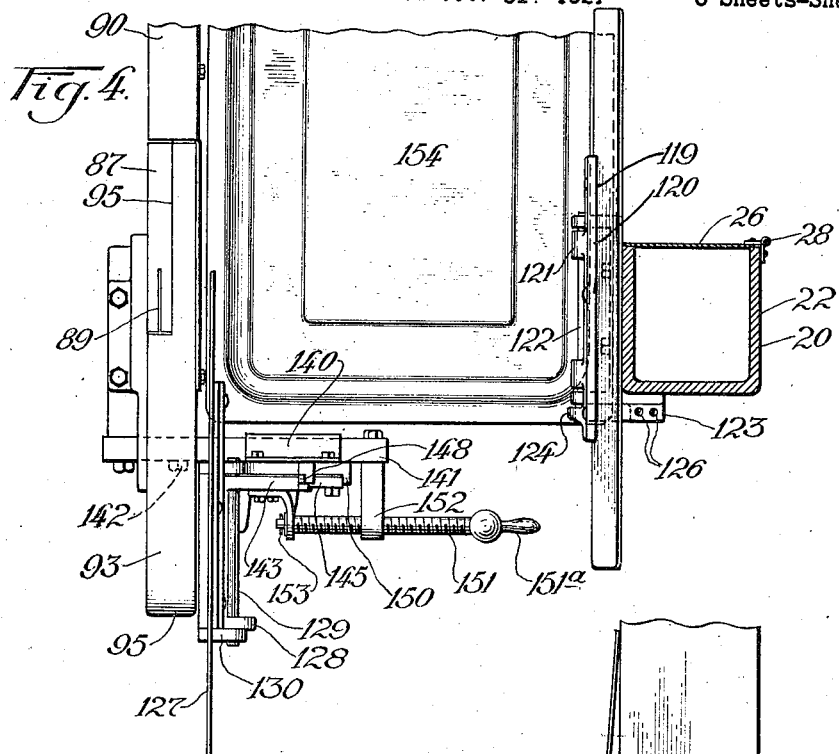
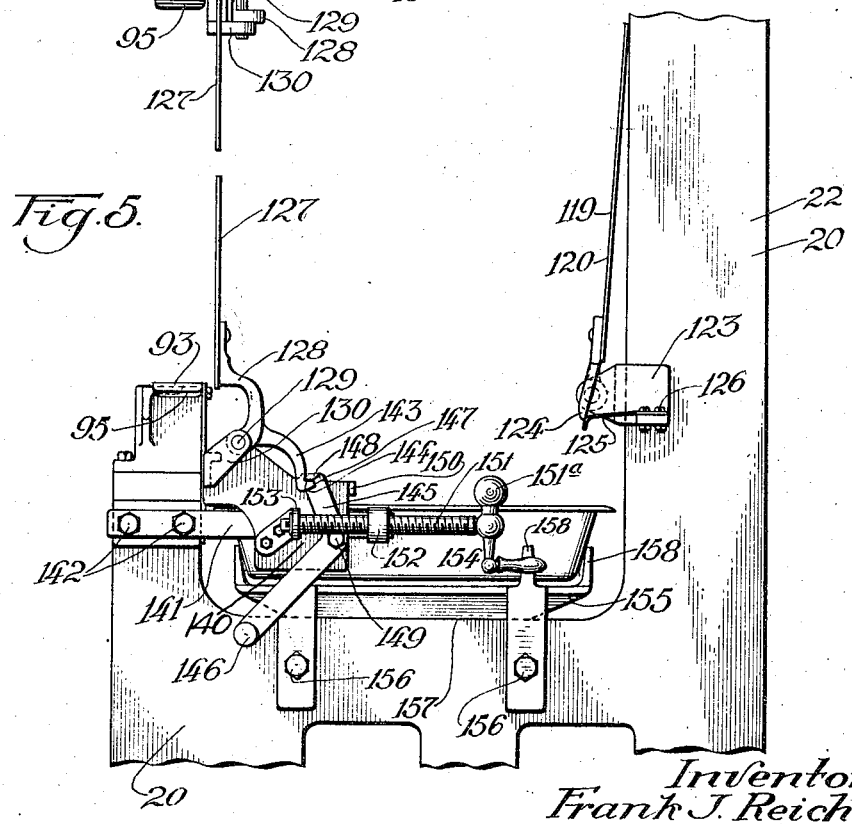
Inventor:
Frank J. Reichmann
By Dyrenforth, Lee, Chritton & Wiles
Attys.

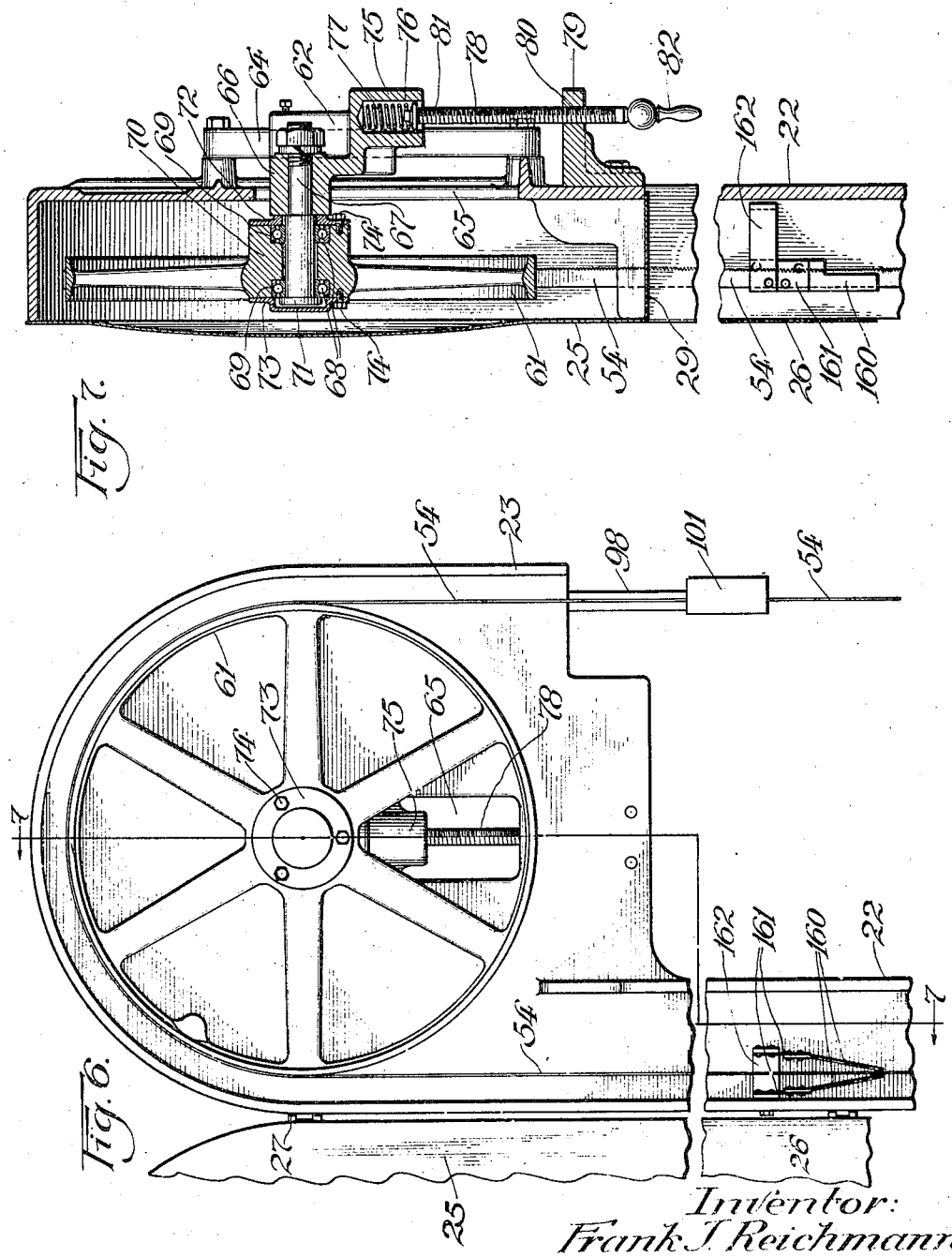

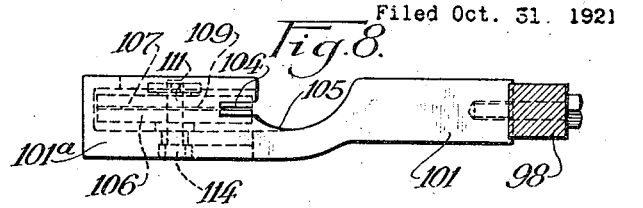
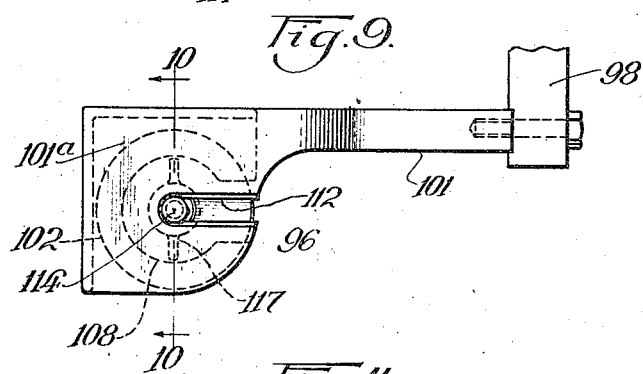
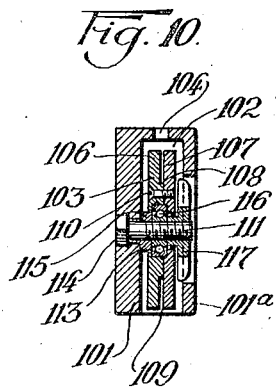
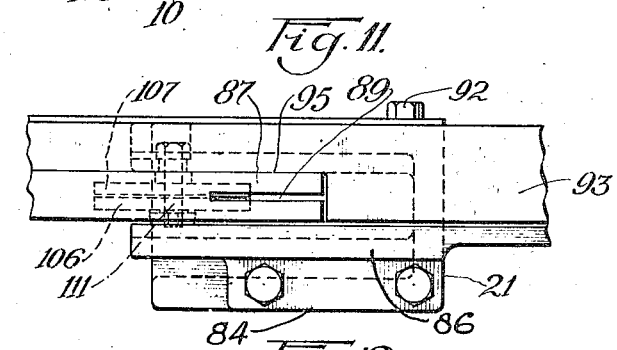
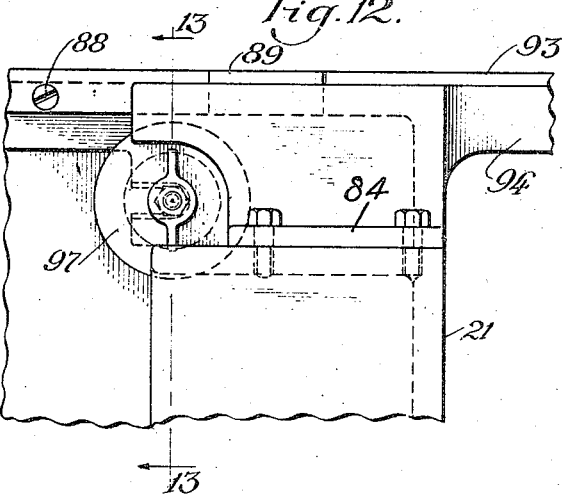
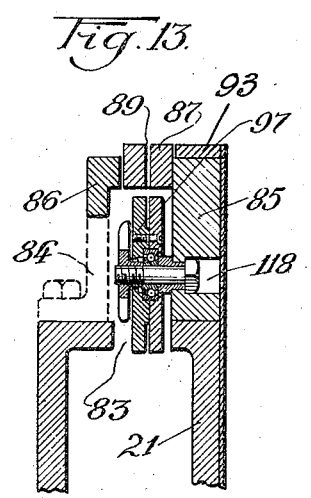

Patented June 24, 1924.

1,499,124

UNITED STATES PATENT OFFICE.

FRANK J. REICHMANN, OF CHICAGO, ILLINOIS.

CUTTING MACHINE.

Application filed October 31, 1921. Serial No. 511,861.

*To all whom it may concern:*

Be it known that I, FRANK J. REICHMANN, a citizen of the United States, residing at Chicago, in the county of Cook and State of Illinois, have invented a new and useful Improvement in Cutting Machines, of which the following is a specification.

My invention relates more particularly to machines for cutting meat and bone; and my object, generally stated, is to provide improvements in machines of this character as hitherto provided, to the end that the machines will be better adapted for performing the work for which they are provided, will be less liable to impairment, be highly sanitary, and of comparatively simple construction.

Referring to the accompanying drawings:

Figure 1 is a view in side elevation of a machine embodying my improvements, showing the extension of the article support in operative position, and a gauge device employed, in inoperative position. Figure 2 is a view in front elevation of the machine with the support extension and gauge in the position shown in Fig. 1. Figure 3 is a plan view of the machine. Figure 4 is a plan sectional view of a part of the machine, showing the extension support swung upwardly out of operating position and the gauge device in operating position, the plane of the section being represented at the line 4 on Fig. 1 and viewed in the direction of the arrow. Figure 5 is a view in side elevation of the part of the structure shown in Fig. 4. Figure 6 is a view in side elevation of the upper end of the machine, a part of the lower portion of the casing upright being also shown, this view showing the hinged casing side swung to open position. Figure 7 is a section taken at the line 7—7 on Fig. 1 and the irregular line 7—7 on Fig. 6, with the hinged cover section in closed position. Figure 8 is an enlarged section taken at the line 8 on Fig. 1 and viewed in the direction of the arrow, showing one of the band-saw-guiding devices in plan. Figure 9 is a view in side elevation of the construction shown in Fig. 8. Figure 10 is a section taken at the line 10—10 on Fig. 9 and viewed in the direction of the arrows. Figure 11 is a plan view of a detail of the machine including another of the band-saw-guiding devices. Figure 12 is a broken view in side elevation of the structure shown in Fig. 11; and Figure 13, a section taken at the line 13—13 on Fig. 12 and viewed in the direction of the arrows.

The machine illustrated is formed of a frame, somewhat in the nature of a casing, represented at 20, to provide a lower casing section 21 from which, at the rear of the machine, a casing portion 22, of relatively small cross-sectional area, rises, and communicates at its lower end with the lower casing section 21, and the upper casing section 23 surmounting the casing portion 22 and opening into the latter. The top of the casing section 23 is rounded from the front to the rear side of the machine, as shown, and the upper interior wall of this casing section is rounded and unobstructed as more particularly shown in Fig. 6 at 25, whereby the interior of this portion of the casing in which the band-saw, hereinafter referred to, operates, is rendered free of projections or depressions in which the particles of meat and bone carried around by the saw, may accumulate.

The frame casing referred to is, by preference, made of a casing as shown, open at one side of the machine, the left hand side thereof in Fig. 2, and also at the bottom of the casing portion 23, this open side of the casing, and the bottom portion of the casing portion 23, being formed of a movable member preferably provided as an upper plate-like section 25 and a lower plate-like section 26, these sections being hinged at their rear edges to the casing-casting as represented at 27 and 28, respectively, to permit the interior of the frame casing to be exposed for access thereto, when the members 25 and 26 are swung rearwardly. The casing side 25 is provided with a substantially horizontal plate-portion 29 having an upwardly-extending plate-like extremity 30 at its forward edge, which, when the casing side 25 is swung to closed position, extends across a portion of the open bottom of the part of the casting forming the casing portion 23 to form a closure for this part of the casing, there being secured to the member 25, as indicated at 31, a spring finger 32 having a deflected portion 33 at one end which extends beneath the ledge 29 and is adapted to lock at its deflected portion 33 with the adjacent side of the casing section 23 for releasably holding the movable casing side 25 in closed position. The movable casing section 26 is also provded with a latch device 34 of the same construction as the latch 32 for releasably holding this casing side in closed position.

The main support for the article to be operated on by the machine comprises, a bracket-like member 35 secured to the casing section 21, as by the bolts 36 and extending forwardly therefrom, the member 35 being formed at its upper edge with oppositely-extending horizontal flanges 37 on which a plate-like member 38 of trough shape is supported, and is secured as by the bolts 36 to extend across the front of the casing frame 20 and transversely thereof. The member 38 by preference is formed of a sheet of aluminum with its front and rear edges, represented at 39 and 40, bent upwardly to extend parallel with each other, with bars 41 preferably of steel secured to the outer surfaces of the flange portions 39 and 40 along their upper edges to extend lengthwise thereof and preferably flush with the top surfaces of these flanges. Each bar 41 is provided in two sections, 42 and 43, these bar sections being secured in place on the flanges in alining position, but spaced apart at their adjacent ends to provide a void, or blank space, 44 therebetween at opposite sides of the trough, the extremities of the bar sections 42 and 43 being preferably downwardly deflected as represented at 45 and 46, respectively. The reenforced flanges 39 and 40 which extend parallel with each other form tracks for a carriage 47 formed of a plate 48, which may be, and preferably is, of aluminum provided at its four corners with depending brackets 49 carrying journaled rollers 50 and laterally-extending studs 51, disposed in vertically-spaced-apart relation at the inner sides of these brackets. The parts are so proportioned that the rollers 50 rest upon the upper reenforced edges of the flanges 39 and 40 and the lugs 51 extend directly below the bars 41, the structure thus provided affording a rolling support for the carriage 47 upon the member 38 and preventing accidental displacement of the carriage in a vertical plane, it being understood that the carriage may be rolled back and forth along the member 38 and therefore transversely of the machine. The voids or spaces 44 are longer than the diameter of the lugs 51 and are provided for the purpose of permitting the carriage 47 to be removed from the supporting member 38 when desired, this being effected by first moving the carriage 47 to a position in which the rollers 50 and lugs 51 thereon, at its right hand side in Fig. 2, register with the spaces 44 at opposite sides of the member 38 and thereupon lifting this end of the carriage 47 to move the lugs 51 above the bars 41, and thereupon shifting the carriage 48 to the right in Fig. 2 until the rollers 50 and lugs 51 on the other end of this carriage register with these spaces 44, and there upon lifting this end of the carriage upwardly. The downturned ends 45 and 46 of the bars 41 serve as stops cooperating with the lugs 51 to limit the movement of the carriage 47 in opposite directions when in assembled relation with the member 38. The carriage 47 is provided at one edge thereof, its right hand edge in Fig. 2, with an upstanding plate-like portion 52 which extends crosswise of the line of movement of the carriage 47 and terminates at its rear edge substantially flush with the rear edge of the plate-portion 48 of the carriage, the member 52 at its rear edge being provided with a lateral extension 53 extending preferably substantially at an angle of 90° to the plane of the member 52, the construction just described serving as a guarding means for the hand of the operator as is hereinafter more fully described.

The machine also comprises an endless band-saw element 54 so supported and arranged that it will extend at one side thereof closely adjacent to the rear edge of the carriage 47 for operating on the material to be operated on and applied to the carriage 47. The band-saw 54 partially encircles, at its lower portion, a pulley 55 journaled in the casing section 21 and shown as provided with a gear 56 driven from a gear 57 secured to the shaft 58 of a motor 59, which may be an electric motor, supported on the casing frame 20, as through the medium of the bracket 60, the pulley 55 being thus a drive pulley through the medium of which the band-saw is caused to operate, the saw moving in the direction of the arrow in Fig. 1. The upper end of the saw 54 partially surrounds a pulley 61 located, and journaled in, the casing section 23. The means shown for supporting the pulley 61 in journaled condition in the casing, comprise a head 62, the opposite vertical edges of which contain longitudinally-extending grooves 63 into which upright guide members 64, carried by the casing section 23, and spaced from the side wall thereof, extend, whereby the head 62 may be vertically adjusted on the casing 20.

The casing section 23 is open between the guide members 64, as indicated at 65, the head 62 being provided with a boss 66 which extends into the opening 65 and rigidly supports a pin 67 at one end of the latter, its opposite end extending into the interior of the casing section 23 and carrying the pulley 61 which is journaled thereon, as through the medium of the ball bearings represented at 68. The races for the ball bearings 68 are set into recesses 69 in opposite faces of the hub portion 70 of the pulley and surround the pin 67 which is headed, as represented at 71, at its overlying end, the bearings being secured in place by means of disks 72 and 73 applied against the opposite ends of the hub 70 and held thereon as by the screws 74. The head 62 is also provided with a depending boss 75 containing a downwardly-opening recess 76 in which a coil spring 77 is located, this coil spring cooperating with the upper end of a threaded shaft 78 which has threaded engagement with a laterally-extending bracket 79 on the casing 20, at a threaded opening 80 therein. The upper end of the shaft 78 is provided with a disk-like head 81 abutting the lower end of the spring 77. It will be understood from the foregoing that by adjusting the pulley 61 through the medium of the head 62, by operating the threaded shaft 78 which is provided with a crank 82 at its lower end, the saw 51 may be caused to be in the desired taut condition, and by providing the spring 77 between the head 62 and the threaded rod 78, the pulley 61 will be forced upwardly to clamp the band-saw 54 against the upper wall of the casing section 23, should the band-saw break, and thus minimize danger. The front portion of the band-saw 54, viz, that shown at the left hand side of Fig. 1, extends upwardly through an opening 83 in the top of the casing section 21 at the front end of the latter, this part of the casing section being surmounted by a casting 84 presenting two spaced-apart upright plate-like portions 85 and 86. A bar 87 is located within the space between the portions 85 and 86 and is secured to the portion 85 as by the screw 88, this bar containing a slot 89 in which the band-saw 54 operates. The portion 85 has superposed thereon a plate-like portion 90 which extends to the left in Fig. 2 from the left hand end of the bar 87, the portion 90 being formed, preferably integrally therewith, with a depending plate-like portion 91 which is located at the outer surface of the member 85 and extends from the left hand end of the member 90 in Fig. 2, a considerable distance to the right in this figure beyond the bar 85, the member 90 with its apron-forming plate-like portion 91 being secured to the member 85, as through the medium of the screws 92 passing through the portion 91 and screwing into the portion 85. Surmounting the casting 84, is a bar 93 which alines with the member 90, this bar-like portion being secured in place as by screws (not shown) extending upwardly through the flange of an extension 94 of the casting 84, the bar 93 containing a recess 95 in which the bar 87 extends. The end of the bar 93 at the right hand side of Fig. 2, is downwardly deflected as represented at 95 for a purpose hereinafter explained, the upper side of this bar, as well as the upper sides of the bar 87 and the member 90 extending in substantially the same horizontal plane as the upper surface of the carriage 47.

Cooperating with the front portion of the band-saw 54 are saw-guiding devices, one of which is represented generally at 96 and the other at 97, the guide 96 being located in a plane above the carriage 47 and the guide 97 in a plane below this carriage. The upper saw-guide 96 comprises a bar 98 vertically adjustable in a boss 99 extending laterally from the fixed side of the casing section 23, a set-screw 100 being provided for setting the bar 98 in adjusted position. The lower end of this bar is provided with a member 101 which extends in substantially horizontal position crosswise of the machine and in the plane of the saw. The outer end of the member 101 is enlarged as shown at 101$^a$, and is hollowed out as represented at 102 to receive a rolling guide member 103. The top wall of the enlarged portion 101$^a$ contains a slot 104 in which the front portion of the saw 54 extends, one side of the bar 101 being recessed as represented at 105 to communicate with one end of the slot 104. The rolling guide device referred to is formed of a pair of disks 106 and 107, the disk 106 being provided on one face thereof with a circular boss 108 against the outer face of which the disk 107 bears, the provision of this boss causing the rolling guide device to present an annular groove 109. The disks 106 and 107 are rigidly secured together, as by means of the screw 110, to render the disks unitary, these disks being rotatably mounted upon a journal carried by the member 101 and journaling the slotted disk structure above referred to, within the space 102 and in such position that the saw 54, extending through the slot 104 also extends into the annular groove 109, the back, or untoothed, edge of the saw extending closely adjacent to the bottom of the groove 109. The particular construction of journal referred to comprises a machine screw 111 which extends into the space 102 through a slot 112 in one side portion of the extension 101$^a$, a bushing 113 surrounding the screw 111 adjacent the head 114 of the latter, the inner end of this bushing being circumferentially enlarged as represented at 115, a ball-bearing device, represented at 116 and comprising inner and outer raceways with interposed balls, surrounding the screw 111 and surrounded by the disks 106 and 107 and confined therein by engaging grooves in the inner peripheries of these disks, and a wingnut 117 screwed upon the outer end of the screw 111 and against the inner raceway of the bearing 116.

The lower roller-guide device 97 is of the same construction as that just described, its journaled support being located within a slot 118 in the side member 85, the annular blade-receiving slot in the periphery of the disk structure of the guide device 97 being so disposed relative to the saw 54, which extends through the slot 89, that these parts will be in vertical alinement and the back edge of the saw will extend closely adjacent to the circular bottom of this annular blade slot.

The guide device 97 is preferably arranged, as shown, to extend closely adjacent to the lower surface of the member 87, and the upper guide device is rendered adjustable by reason of the adjustable bar 98, to set the upper roller guide device into the desired close position relative to the upper surface of the material being acted upon by the saw and supported on the carriage 47, the purpose being to provide for the guiding of the saw above and below the material being operated on, at points spaced apart the minimum distance considering the height of the material being operated on, so that the tendency of the saw to vibrate will be minimized.

It may be stated that the provision of the rolling saw-guiding devices, as illustrated and described, is of great advantage as not only is there afforded to the saw relatively broad bearing surfaces at opposite sides thereof, but also friction is reduced to the minimum due to the rolling action of these guide devices, a condition which is desirable for many reasons among which are the maintaining of the saw in cool condition, rolling contact of the back edge of the saw with the circular bottom wall of the annular groove in the guide device preventing fatiguing of the metal at the rear edge of the saw and minimizing danger of breakage of the saw.

Furthermore, the rolling guide devices may be readily removed and replaced, as for example to permit of the cleaning thereof, the removal of these devices also permitting of ready access to the space 102 to clean the latter of accumulated particles of meat and bone.

It often becomes desirable in machines of this general character, to provide for the supporting of the material to be operated on, at both sides of the saw, this commonly occurring where, for example, it is desired to cut into smaller sections the relatively large portion of a carcass of an animal. This is provided for in my improved machine by the extension support represented at 119, this support being formed of a plate-like member 120 which may be, and by preference is, of aluminum which is rigidly connected with a member 121 rotatably mounted on a shaft 122 rigidly secured to the frame section 22 of the machine, through the medium of brackets 123, to extend crosswise of the frame of the machine. The shaft 122 is so positioned that when the member 119 is swung to substantially horizontal position, as shown in Fig. 1, the upper surface of the plate-portion 120 will extend in substantially the same horizontal plane as the upper surface of the plate 48 of the carriage 47, the provision of the parts as stated permitting of the swinging of the support-extension 119 to substantially upright position at the rear of the machine, as represented in Fig. 5. The member 120 is provided at one end with a finger 124 adapted to cooperate with a leaf spring 125 rigidly secured at its rear end to one of the brackets 123 as indicated at 126, the spring 125 being so disposed that when the member 119 is swung to uppermost position (Fig. 5) the downwardly-turned end of the spring 125 presses against the rear surface of the finger 124 and yieldingly forces the member 119 in a direction to prevent it from accidentally swinging toward the carriage 47.

The machine also is provided with a gauge for regulating the thickness of the slices cut by the machine as for example in the cutting of chops and meat slices, as, for example, cuts of ham and slices of steak. The gauge device shown comprises a plate-like member 127 preferably of aluminum rigidly secured, to extend crosswise of the machine, on a yoke-shaped member 128 which is journaled on a shaft 129 secured at its ends in a yoke-shaped member 130 provided at one end with a sleeve portion 140 at which it surrounds a horizontally-disposed bar 141 secured to the casing frame at 142 and projecting rearwardly, the sleeve portion 140 being slidable lengthwise of the bar 141 for the purpose of adjusting the plate-portion 127 toward and away from the front portion of the saw 54 which it parallels. The parts 127 and 128 of the gauge are adapted to be swung from vertical operating position (Fig. 5), in clockwise direction in this figure, to substantially horizontal position (Fig. 1) in which latter position these parts extend below the plane occupied by the support-extension 119 when the latter is in horizontal position, thereby avoiding obstruction to the positioning of the extension-support 119 in operative position. Means are provided for releasably holding the gauge 127 in vertical position, these means comprising a finger 143 provided on the yoke 128 and formed with an upwardly-facing shoulder 144 adapted to cooperate with a lever 145 shown as of bellcrank form, its lower end being provided with a crank-handle 146 and its upper end containing a notch 147 into which the shoulder portion 144 of the arm 143 extends when the plate 127 is in vertical position, the sleeve member 140 being provided with a lug 148 extending laterally therefrom and in a position to be engaged by the upper surface of the shoulder 144 when the plate 127 is in vertical position. The lever 145 is pivoted on the slide member 140, at 149 and so weighted, in the construction shown by providing its lower crank-equipped arm of greater length than its other arm, as to normally extend in the position shown in Fig. 5, the lug 148 preventing this lever from swinging beyond this position. Thus, when it is desired to swing the gauge 127 to horizontal position, the operator rotates the lever 145 in clockwise direction in Fig. 5 to withdraw the notch 147 from the shoulder 144 and thereupon swings the swingingly-mounted portion of the gauge to horizontal position. When it is desired to swing this portion of the gauge to vertical position, the operator swings it upwardly in anti-clockwise direction, and the same becomes automatically locked in this position, this being due to the support of the lever 145 as stated which permits it to rock out of the way of the shoulder portion 144 in the movement of the gauge to vertical position, and as soon as vertical position has been reached, to automatically rock in the opposite direction to carry its notched portion 147 into interlocked relation to the shoulder 144 as shown in Fig. 5. The slide 140 is also provided with a lug 150 extending laterally therefrom at its rear edge to limit the rocking of the lever 145 in clockwise direction in Fig. 5.

As a means for adjusting the gauge device toward and away from the front portion of the saw and retain it in adjusted position, I provide a threaded rod 151 which has threaded engagement with a bar extension 152 on the bar 141, this rod being provided at one end with a crank-portion 151$^a$ for turning it, and at its opposite end swiveled to a bracket 153 extending laterally from the slide 140, the swivel arrangement 153 being such that the rod 151 may rotate in the bracket 153, but will not have longitudinal movement relative to this bracket.

The machine, as shown, is also provided with a removable pan 154 for receiving the meat cut into slices by the machine, this pan being supported on a frame-like member 155 secured to the casing frame by the screws 156 and resting upon the depressed portion 157 of the casing section 21, the frame 155 being provided at its opposite ends and sides with upwardly-extending lugs 158 which extend at the outer surfaces of the pan 154 when the same is positioned in place and serve to prevent accidental displacement of the pan. The bottom of the casing section 21 is open and one side wall thereof is preferably cut away for a considerable distance above the base line of the machine, for receiving an open-ended receptacle, represented at 159, which is preferably movable into and out of a position in which the particles of meat and bone carried over by the saw may drop into it.

The machine is also, by preference, provided with means for cleaning the saw of the particles of meat and bone cut thereby and carried up and around the pulley 61, the means shown comprising a pair of fingers 160, preferably of aluminum, which are supported to extend at opposite sides of the saw and converge downwardly toward, and into contact with, the saw, the upper ends of these fingers being connected with the lower ends of leaf springs 161 secured at their upper ends to the arms of a U-shaped member 162 rigidly secured at one leg thereof to a wall of the casing portion 22 in the interior of which it extends.

The operation of the machine will be readily understood from the foregoing description, it being understood that the body of material to be cut by the saw, as for example a piece of meat, is positioned on the carriage 47 and up against the plate 52 to project rearwardly beyond the rear edge of the carriage, to the desired extent, depending upon the thickness of the piece to be cut from the body operated on. Where the overhang of the body of material rearwardly beyond the carriage 47 is such that support of this overhanging part is required, the operator will swing the extension support 119 to the position shown in Fig. 1, and where the body of material is to be cut into slices of a predetermined thickness, the operator causes the support extension 119 to occupy the position shown in Fig. 5 and will swing the gauge device 127 to the position shown in this figure, and by operating the threaded rod 151 will so position this gauge relative to the front portion of the saw 54 that a slice of the desired thickness will be cut from the body of material.

After the material has been positioned on the carriage 47 and the support-extension and guide have been adjusted to the desired positions as described, the operator, assuming the motor to be running, shifts the carriage 47 to the left in Figs. 2 and 3, thereby carrying the body of material to be cut into engagement with the saw. Where the gauge device is in operating position, the slices cut from the body of material may be permitted to fall into the pan 154, or lifted by the operator at the conclusion of the cutting by the saw. In this last-referred-to connection it will be noted that the left hand edge of the gauge-plate extends to the left of the teeth of the saw, viewing the machine as in Fig. 2, and thus serves in a measure to guard against the contacting of the hand of the operator with the saw teeth when his hand is grasping the slice being severed by the saw, and thus aids in militating against danger in the operation of the machine.

The operator in operating the machine would apply his right hand against the face of the plate 52 at the right hand side of Fig. 2, with his thumb positioned against the body of material lying on the carriage, and as a means for guarding against the contacting of the fingers of this hand of the operator, with the saw, the guard portion 53 is provided which effectually prevents the fingers from extending into a position in which they will be in the path of movement of the saw.

It will be noted from the foregoing that the inner, upper, circular wall of the casing section 23, by being free of depressions or projections, is rendered very sanitary, permitting it to be readily cleaned, and the tendency of the particles of meat and bone carried up by the saw, is to fall out of the casing rather than adhere thereto. It being desirable to form the casting comprising this upper casing section of as light weight, and as little metal, as possible, any reenforcing ribs desired to be formed on the casing side would be provided on the exterior surface thereof, as shown in the drawings.

The feature of providing the plate-portion 29 on the swinging side section of the casing, across the central portion of the casing section 23, to form an apertured bottom for this casing section, is of advantage, as it facilitates the cleaning of this part of the structure, it being rendered readily accessible for cleaning by swinging the casing side 25 to open position (Fig. 6).

The construction of the saw-cleaning device shown in Fig. 6, as described, is of advantage, as the soft metal fingers 160 produce effective cleaning of the blade, and insure a snug contact between the cleaning device and the saw-blade, due to the wearing in of the saw into the soft metal.

The purpose of the downwardly tapering portion 95, is to avoid obstruction from this part of the machine, to the material as it is being moved back and forth relative to the saw, while imposed on the carriage.

In making a heavy cut the saw 54 is subjected to force tending to laterally deflect it and thus where the saw-guides above and below the material being cut are rigid, there is great tendency to breaking of the saw. By constructing the guide-roller devices as shown and described, they are capable of tilting laterally on their ball-supports to a sufficient degree to greatly reduce the tendency to breakage of the saw.

While I have illustrated and described a particular construction involving my invention, I do not wish to be understood as intending to limit it thereto as the same may be variously modified and altered without departing from the spirit of my invention.

What I claim as new, and desire to secure by Letters Patent, is:

1. In a machine of the character set forth, the combination of a saw, means for operating the saw, a support for the material to be sawed, a member adjustable toward and away from said saw, a gauge pivoted on said member, said gauge having an arm portion, and means on said member releasably engaging said arm-portion for holding said gauge in operating position.

2. In a machine of the character set forth, the combination of a saw, means for operating the saw, a support at one side of the saw for the material to be sawed, a gauge at the other side of the saw and movable into and out of operative position, and an extension for said support adjacent the side of the saw opposite that at which said support extends and movable into and out of a position in which it forms an extension of said support, said gauge being so arranged that when it is moved to inoperating position it is out of the way of the extension in moving to operating position.

3. In a machine of the character set forth, the combination of a saw, means for operating the saw, a support at one side of the saw for the material to be sawed, a pivoted gauge at the other side of the saw and movable into and out of operative position, and an extension for said support adjacent the side of the saw opposite that at which said support extends and movable into and out of a position in which it forms an extension of said support, said gauge being so arranged that when it is moved to inoperating position it is out of the way of the extension in moving to operating position.

4. In a machine of the character set forth, the combination of a saw, means for operating the saw, a support at one side of the saw for the material to be sawed, a gauge at the other side of the saw and movable into and out of operative position, and a pivoted extension for said support adjacent the side of the saw opposite that at which said support extends and movable into and out of a position in which it forms an extension of said support, said gauge being so arranged that when it is moved to inoperating position it is out of the way of the extension in moving to operating position.

5. In a machine of the character set forth, the combination of a saw, means for operating the saw, a support at one side of the saw for the material to be sawed, a pivoted gauge at the other side of the saw and movable into and out of operative position, and a pivoted extension for said support adjacent the side of the saw opposite that at which said support extends and movable into and out of a position in which it forms an extension of said support, said gauge being so arranged that when it is moved to inoperating position it is out of the way of the extension in moving to operating position.

FRANK J. REICHMANN.